United States Patent
Lhermite

(10) Patent No.: US 7,443,699 B2
(45) Date of Patent: Oct. 28, 2008

(54) NEGATIVE CURRENT COMPENSATION METHOD AND CIRCUIT

(75) Inventor: Francois Lhermite, Lasserre (FR)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 379 days.

(21) Appl. No.: 10/566,565

(22) PCT Filed: Sep. 23, 2003

(86) PCT No.: PCT/US03/30581

§ 371 (c)(1),
(2), (4) Date: Jun. 27, 2006

(87) PCT Pub. No.: WO2005/041395

PCT Pub. Date: May 6, 2005

(65) Prior Publication Data

US 2007/0247520 A1    Oct. 25, 2007

(51) Int. Cl.
*H02M 3/335* (2006.01)

(52) U.S. Cl. ................ 363/20; 363/56.01

(58) Field of Classification Search .......... 363/20, 363/21.01, 56.01, 56.09, 95, 131
See application file for complete search history.

(56) References Cited

U.S. PATENT DOCUMENTS

| 5,784,231 A | 7/1998 | Majid et al. |
| 5,892,355 A * | 4/1999 | Pansier et al. ............. 323/315 |
| 6,459,594 B1 * | 10/2002 | Tsuji et al. ............. 363/21.08 |

OTHER PUBLICATIONS

Data Sheet, Integrated Circuits "TEA1 533P; TEA1 533AP GreenChip ™II SMPS control IC", Aug. 23, 2002, Philips Semiconductors, 23 pps.
Data Sheet, Integrated Circuits "TEA1 552 GreenChip ™II SMPS control IC", Aug. 27, 2002, Philips Semiconductors, 23 pps.

* cited by examiner

*Primary Examiner*—Adolf Berhane
(74) *Attorney, Agent, or Firm*—Robert F. Hightower

(57) ABSTRACT

A power supply controller (10, 60, 70) uses a negative current (36) of a power transistor (16, 71) to detect the valley point for enabling the power transistor when driving an inductor (17). The negative current occurs when the inductor is de-magnetized and can be used for controlling the time to enable the power transistor.

20 Claims, 5 Drawing Sheets

NEGATIVE CURRENT COMPENSATION METHOD AND CIRCUIT

BACKGROUND OF THE INVENTION

The present invention relates, in general, to electronics, and more particularly, to methods of forming semiconductor devices and circuits.

In the past, the semiconductor industry utilized various methods and structures to determine the de-magnetization point of inductors that were utilized in power supplies and power supply controllers. Typically, transformers utilized in the power supply controllers had auxiliary windings that assisted in detecting the de-magnetization point. Examples of such implementations are disclosed in U.S. Pat. No. 5,784,231 issued to Majid et al on Jul. 21, 1998 and also in U.S. Pat. No. 5,892,355 issued to a Pansier et al on Apr. 6, 1999 both of which are hereby incorporated herein by reference. One problem with these prior techniques was the auxiliary windings and associated circuitry connected to the auxiliary inductor. The extra windings and circuitry increased the cost of the power supply system.

Another technique is disclosed in U.S. Pat. No. 6,469,484 issued to L'Hermite et al on Oct. 22, 2002 which is hereby incorporated herein by reference. This technique utilized additionally circuitry and had an associated cost.

Accordingly, it is desirable to have a method of detecting the de-magnetization point that does not use an auxiliary winding and that reduces the cost of the circuit and system.

For simplicity and clarity of illustration, elements in the figures are not necessarily to scale, and the same reference numbers in different figures denote the same elements. Additionally, descriptions and details of well known steps and elements are omitted for simplicity of the description. As used herein current carrying electrode means an element of a device that carries current through the device such as a source or a drain of an MOS transistor or an emitter or a collector of a bipolar transistor, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention.

DETAILED DESCRIPTION OF THE DRAWINGS

Figure 1:
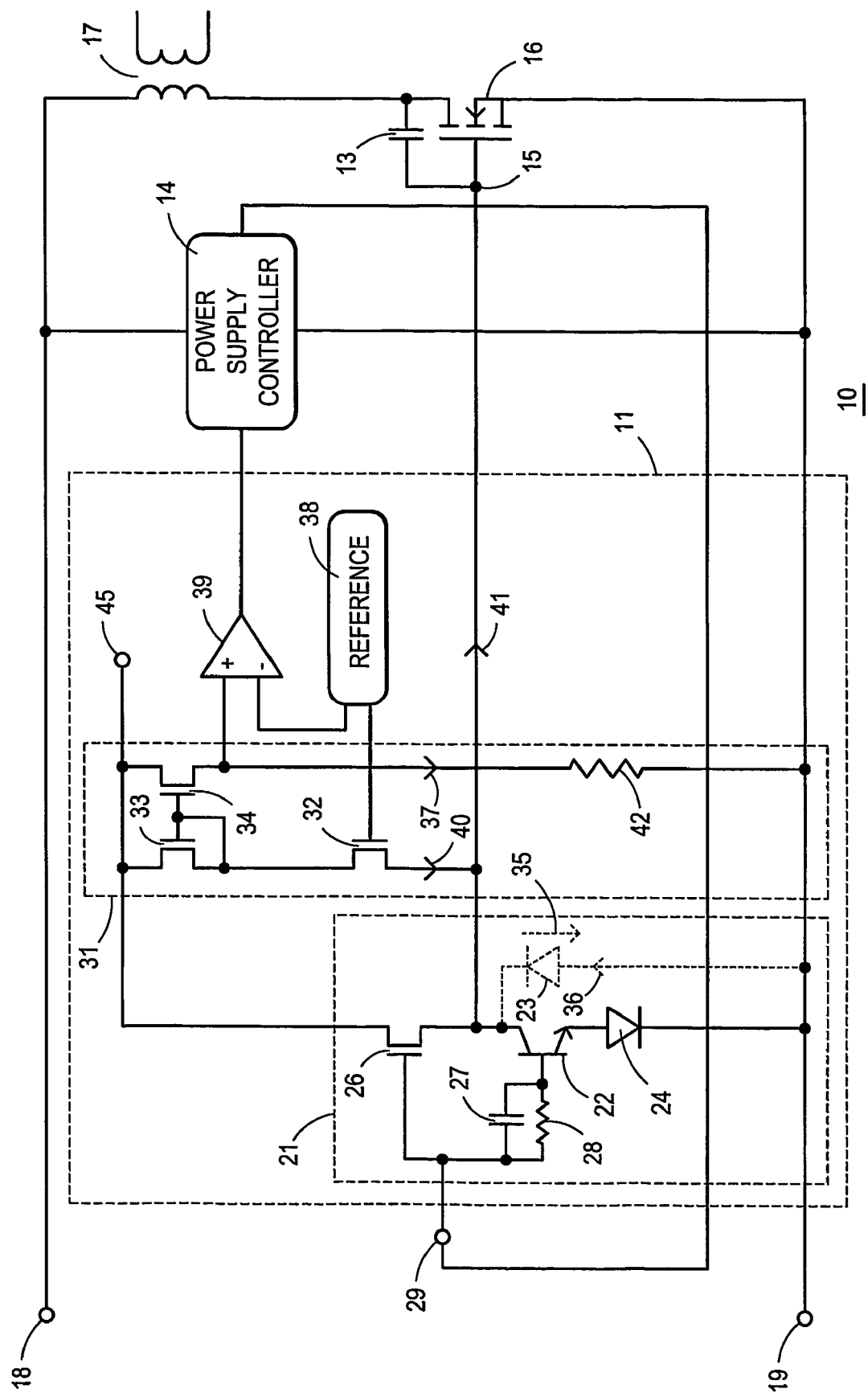
FIG. 1 schematically illustrates a portion of an embodiment of a valley voltage detection circuit in accordance with the present invention.

FIG. 1 schematically illustrates a portion of an embodiment of a power system controller 10 that includes a valley voltage detection circuit 11. Power system controller 10 generally includes a transformer 17, a power supply controller 14 such as a switching power supply controller or a pulse width modulated (PWM) controller, and an MOS power transistor 16 that has a parasitic gate-to-drain capacitance (often referred to as Crss) represented by a capacitor 13.

Detection circuit 11 includes a driver 21, a conversion circuit 31, a reference generator or reference 38, and a comparator 39. Reference 38 generates an offset reference voltage and a detection reference voltage on two different outputs that are used by driver 21 and comparator 39, respectively. Reference 38 may be any one of various reference circuits that are well known to those skilled in the art. Driver 21 includes an upper MOS driver transistor 26 that is used to enable transistor 16 and a lower bipolar driver transistor 22 that is utilized to disable transistor 16. Thus transistor 22 drives transistor 16. A diode 23, shown by phantom lines, represents a parasitic substrate-to-collector diode of transistor 22. An optional speedup circuit utilizes a capacitor 27 and a resistor 28 to increase the switching speed of transistor 22. Driver 21 also includes a blocking diode 24. Conversion circuit 31 includes a detection transistor 32, a current mirror that includes a mirror reference transistor 33 and a mirror slave transistor 34, and an output resistor 42. Circuit 11 receives an operating voltage on a voltage input 45. The operating voltage typically is derived from the voltage applied to input 18 by a variety of means, such as a zener diode and a resistor, as is well known to those skilled in the art.

Controller 10 typically receives an input voltage that is applied between a voltage input 18 and a voltage return 19. In some embodiments, the input voltage may be a rectified and filtered line voltage but may be other voltages in other embodiments. Transformer 17 is connected between input 18 and transistor 16 so that the input voltage is applied to a primary inductor of transformer 17 and so that current flows through the primary inductor and induces current flow through a secondary inductor of transformer 17. Power transistor 16 has a drain connected to one terminal of transformer 17 and a source connected to return 19 in order to control current flow through a primary inductor of transformer 17. A gate of transistor 16 is connected to an output of driver 21 so that driver 21 may enable and disable transistor 16 responsively to a control signal applied to a control input 29 of driver 21. The control signal typically is generated by power supply controller 14. The output of comparator 39 is applied to a demagnetization input of controller 14. Capacitor 13 is illustrated as connected to the gate of transistor 16 at a node 15 for convenience of the explanation.

Figure 2:
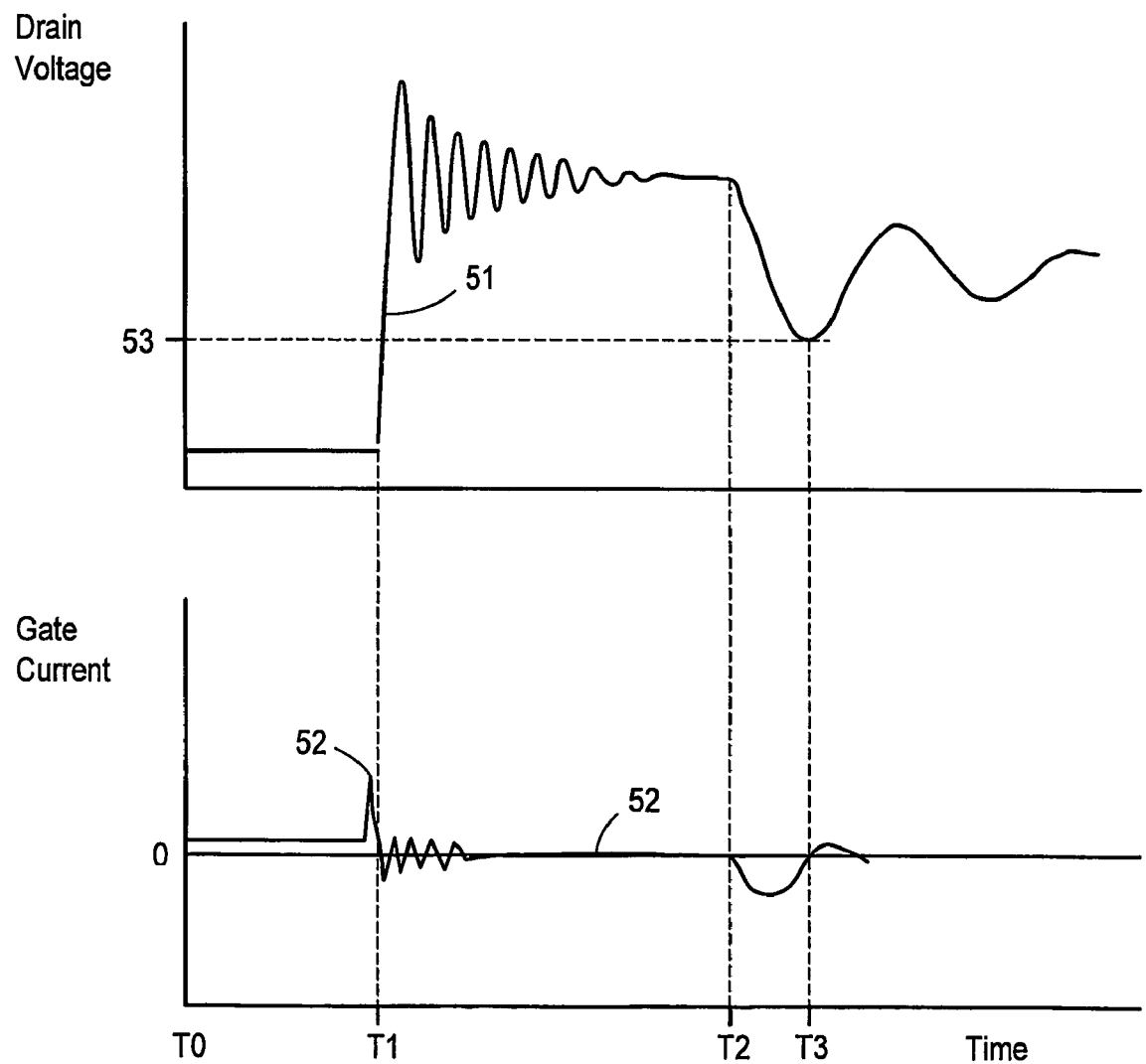
FIG. 2 is a graph illustrating current and voltage at some points within the valley voltage detection circuit of FIG. 1 in accordance with the present invention.

FIG. 2 is a graph having a plot 51 that illustrates the drain voltage of transistor 16 as referenced to return 19, and a plot 52 that represent the current flowing into the gate of transistor 16 during one particular portion of the operation of controller 10. The magnitude of the gate current is exaggerated to ensure that it may be easily displayed. This explanation has references to both FIG. 1 and FIG. 2. At a time T0, transistor 26 is enabled and is holding the gate of transistor 16 high thereby enabling transistor 16. As shown by plot 51 the drain of transistor 16 is low and current is flowing through the inductor of transformer 17 and through transistor 16 to return 19. Transistor 26 supplies current, such as charging current or leakage current, to the gate of transistor 16 as shown by plot 52. At a time T1, controller 14 supplies a control signal to driver 21 that turns-off transistor 26 and enables transistor 22 to disable transistor 16. When transistor 16 is disabled, the energy stored in the inductor of transformer 17 pulls the drain of transistor 16 high. The current from capacitor 13 is conducted to ground by transistor 22. Between time T1 and a time T2 the primary inductor of transformer 17 is dissipating the stored energy and causes the drain voltage of transistor 16 to oscillate or ring as shown by plot 51. The oscillation in the drain voltage causes a corresponding oscillation in the gate current as shown by plot 52. As is well known in the art, controller 14 typically has a blanking window that ignores the demagnetization signal during this time. In some embodiments, a resistor may be inserted in series between node 15 and the output of circuit 31 to reduce the oscillation shape and the associated effects. As the stored energy is dissipated, the drain voltage asymptotically decays until reaching a relatively flat plateau voltage just before time T2. At time T2, the inductor of transformer 17 becomes de-magnetized and the drain voltage,of transistor 16 begins falling toward a value often referred to as a valley voltage 53. The voltage decrease causes a negative voltage variation in the drain voltage. The drain voltage change causes the terminal of capacitor 13 that is attached to the drain, to go negative with respect to the other capacitor terminal and induces a negative current 41, illustrated by an arrow, to begin flowing from return 19 toward capacitor 13 at node 15. The magnitude of current 41 is determined by the value of capacitor 13, the frequency of the voltage change, and the absolute value of the voltage change. As negative current 41 begins flowing, a first portion of current 41 begins flowing from return 19 toward node 15 as a negative current 36. Diode 24 prevents negative current 36 from flowing through transistor 22, consequently current 36 begins flowing through body diode 23 to the collector of transistor 22 and to capacitor 13 at node 15. Without diode 24, current 36 would flow in the reverse direction through transistor 22 from the emitter to the collector. Thus, diode 24 blocks current 36 from flowing through driver transistor 22. In one exemplary configuration, capacitor 13 was thirty picofarads (30 pf), the frequency was about five hundred kiloHertz (500 kHz), and the voltage change was about one hundred volts (100 V). The resulting current was about ten mill-amps (10 ma) and the negative portion of the current, current 36, was about five mill-amps (5 ma).

As current 36 flows through diode 23, a negative voltage 35, illustrated by an arrow, is developed across diode 23. This negative voltage lowers the voltage that is applied to the source of transistor 32 to a value that is below the value of the voltage applied to return 19. The lower voltage at the source of transistor 32 increases the gate-to-source voltage of transistor 32. When voltage 35 becomes sufficiently large, transistor 32 is fully enabled and current 36 flows through diode 23 to capacitor 13 at node 15. Once voltage 35 reaches a value such that the offset reference voltage from reference 38 minus the magnitude of voltage 35 equals the threshold voltage of transistor 32, then transistor 32 is fully enabled. After transistor 32 is enabled, transistor 32 clamps voltage 35 and limits the value of voltage 35 as shown below:

$$V35 = Vref - Vth - Von$$

where;
V35=the clamped value of voltage 35 across diode 23,
Vref=the offset reference voltage applied to the gate of transistor 32,
Vth=the threshold voltage of transistor 32, and
Von=the voltage dropped across diode 23 when diode 23 turns-on and begins conducting current.

Typically the offset reference voltage is selected so that transistor 32 is fully enabled when voltage 35 is less than or equal to the maximum forward voltage drop across diode 23 and preferably is no greater than about 0.2 to 0.3 volts. In order to provide such a value for voltage 35, the value of the offset reference voltage typically is approximately equal to the threshold voltage of transistor 32. As will be seen hereinafter, this value of voltage 35 assists in keeping the value of current 36 small.

Once transistor 32 is enabled, transistor 32 and transistor 33 of the current mirror generate a positive compensation current 40 that flows from input 45 through transistors 32 and 33 to the gate of transistor 16. Current 40 compensates for negative current 41 that is required by capacitor 13. A small amount of negative current 41 continues to flow through diode 23 as current 36. However, transistor 32 has clamped the value of voltage 35 to a small value thereby causing the impedance through diode 23 to be larger than the impedance through transistors 32 and 33, thus, current 36 is much smaller than current 40. Typically, current 40 is at least fifty (50) times greater than current 36. Without transistor 32 supplying current 40 and clamping voltage 35, all of negative current 41 would flow through diode 23 and would detrimentally affect the operation of controller 14.

Because of the current mirror connection, current 40 flowing through transistor 33 induces an output current of the current mirror or a detection current 37, illustrated by an arrow, to flow through transistor 34 and resistor 42 to return 19. Detection current 37 flowing through resistor 42 generates a voltage across resistor 42 that is applied to a non-inverting input of comparator 39. When the voltage across resistor 42 is greater than the detection reference voltage applied to the inverting input of comparator 39, the output of comparator 39 goes high. When the drain voltage of transistor 16 reaches the valley point at a time T3, current 36 decreases to approximately zero thereby causing current 37 to also decrease to approximately. The decrease in current 37 reduces the value of the voltage across resistor 42 and the output of comparator 39 once again goes low. The high to low transition at the output of comparator 39 substantially coincides with the drain voltage reaching valley voltage 53. Thus, the output of comparator 39 is used by controller 14 to control enabling transistor 16 when the current through the inductor of transformer 17 is at a minimum value. As can be seen, conversion circuit 31 converted negative current 36 into a positive current 37 that can easily be utilized to form a voltage for detecting the valley voltage point at time T3. This positive current is much easier to use than a negative current or negative voltage. Also, the value of resistor 42 or the ratio of the current mirror easily can be adjusted to provide a larger voltage for comparator 39 than that provided by prior techniques. Thus, detecting current 37 is much easier, less expensive, and more reliable than trying to directly detect current 36.

In the preferred embodiment, transistor 16 is an N-channel MOS power transistor, transistors 26, 33, and 34 are P-channel MOS transistors, transistor 32 is an N-channel MOS transistor, and transistor 22 is a bipolar transistor. It should be noted that transistor 16 could also be a P-channel MOS transistor, or a bipolar transistor, and that transistor 22 may also be an N-channel MOS transistor or a PNP bipolar transistor or may be a parallel combination of a bipolar transistor and an MOS transistor. Additionally, driver 21 and detector circuit 31 may be used to detect a negative current in a control electrode of any transistor even if the transistor is not driving an inductor.

Referring again to FIG. 2, the negating excursions of the ringing between time T1 and time T2 is also detected by circuit 31 and produces transitions at the output of comparator 39 in the same manner as described relating to operation between time T2 and T3. However, these transitions typically are ignored by controller 14.

Referring again to FIG. 1, in the preferred embodiment, transistor 26 has a source connected to input 45, a drain connected to the output of driver 21, and a gate connected to input 29. Transistor 22 has a collector connected to the output of driver 21, an emitter connected to a first terminal of diode 24 which has a second terminal connected to return 19. A base of transistor 22 is connected to a first terminal of capacitor 27 and a first terminal of resistor 28. A second terminal of capacitor 27 is connected to a second terminal of resistor 28 and to input 29. Input 29 is connected to an output of controller 14. Transistor 32 has a source connected to the output of driver 21, a gate connected to the offset reference voltage output of reference 38, and a drain connected to a drain and a gate of transistor 33. A source of transistor 33 is connected to voltage input 45. Transistor 34 has a gate connected to the gate of transistor 33, a source connected to input 45, and a drain connected to the non-inverting input of comparator 39 and to a first terminal of resistor 42. A second terminal of resistor 42 is connected to return 19. An inverting input of comparator 39 is connected to a detention reference voltage output of reference 38 and an output of comparator 39 is connected to an input of controller 14. In another embodiment, the inputs of comparator 39 may be reversed. In such a case, controller 14 would operate with an inverted polarity of the demagnetization signal from comparator 39.

Figure 3:
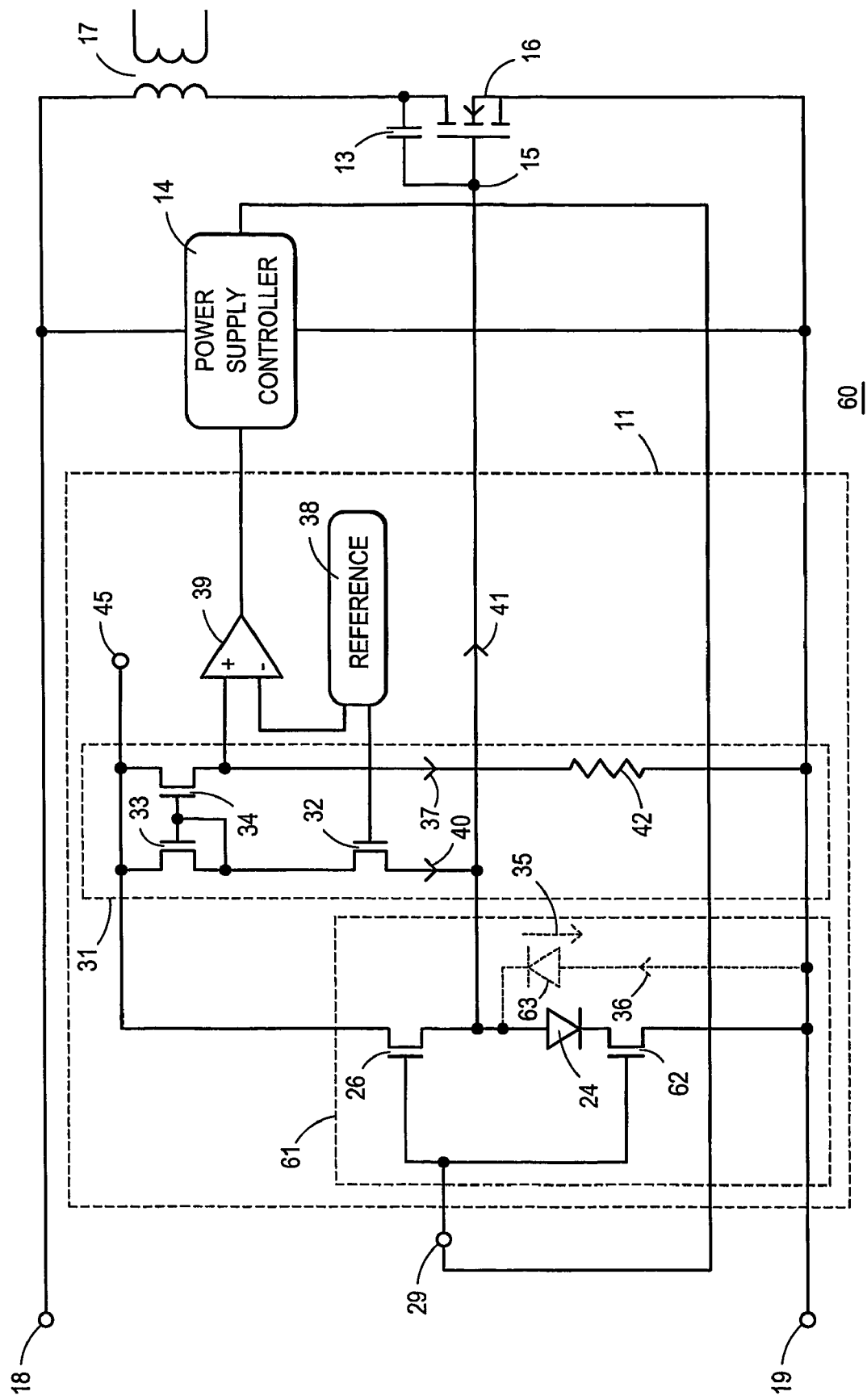
FIG. 3 schematically illustrates a portion of a second embodiment of a valley voltage detection circuit in accordance with the present invention.

FIG. 3 schematically illustrates a portion of an embodiment of a power supply controller 60 that is an alternate embodiment of controller 10 explained in the description of FIG. 1. Controller 60 includes a driver 61 that is an alternate embodiment of and functions similarly to driver 21. Driver 61 includes a lower MOS driver transistor 62 that replaces transistor 22 shown in FIG. 1 and functions similarly to transistor 22. Transistor 62 has a parasitic body diode 63, often referred to as a parasitic substrate diode, that functions similarly to diode 23. Diode 24 is connected in series between transistor 62 and the source of transistor 32 so that the signal applied to input 29 does not require an offset to ensure that transistor 62 is disabled. As in the operation of driver 21, diode 24 in driver 61 blocks negative current 36 from flowing through transistor 62. In another embodiment, diode 24 may be connected in series between transistor 62 and return 19. Diode 24 could be a regular P-N junction diode or could be a Schottky diode.

In the preferred embodiment, transistor 62 is an N-channel MOS transistor. In this embodiment, transistor 62 has a source connected to return 19, a drain connected to the cathode of diode 24, and a gate connected to input 29 An anode of diode 24 is connected to the output of driver 61.

Figure 4:
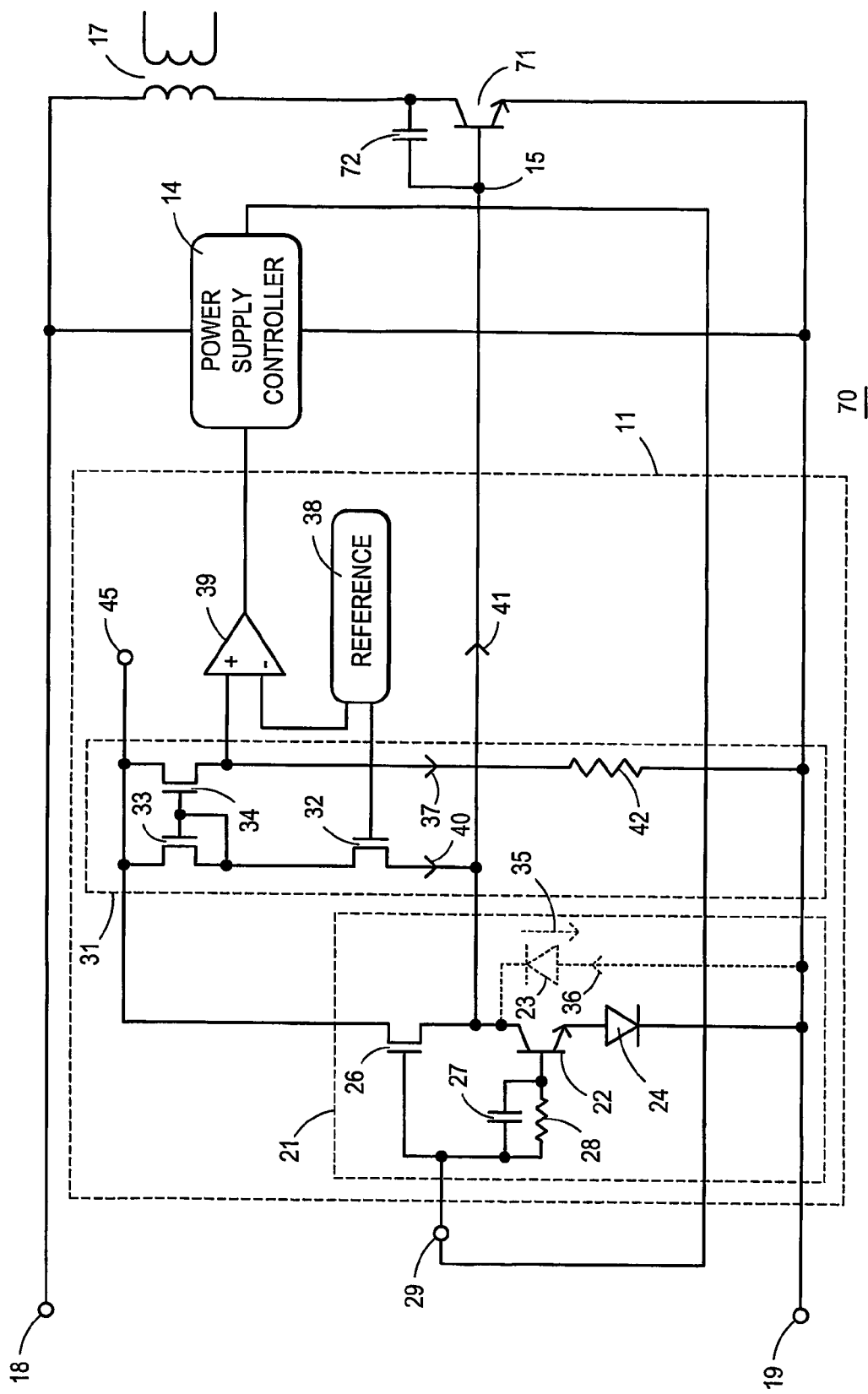
FIG. 4 schematically illustrates a portion of a third embodiment of a valley voltage detection circuit in accordance with the present invention.

FIG. 4 schematically illustrates a portion of an embodiment of a power supply controller 70 that is an alternate embodiment of controller 10 illustrated in the description of FIG. 1. Controller 70 includes a power transistor 71 that replaces transistor 16 and functions similarly to transistor 16. Transistor 71 includes a parasitic collector-to-base capacitance that is illustrated by a capacitor 72. Capacitor 72 functions similarly to capacitor 13.

Transistor 71 has a collector connected to the first terminal of transformer 17, an emitter connected to return 19, and a base connected to node 15 and to the output of driver 21.

Figure 5:
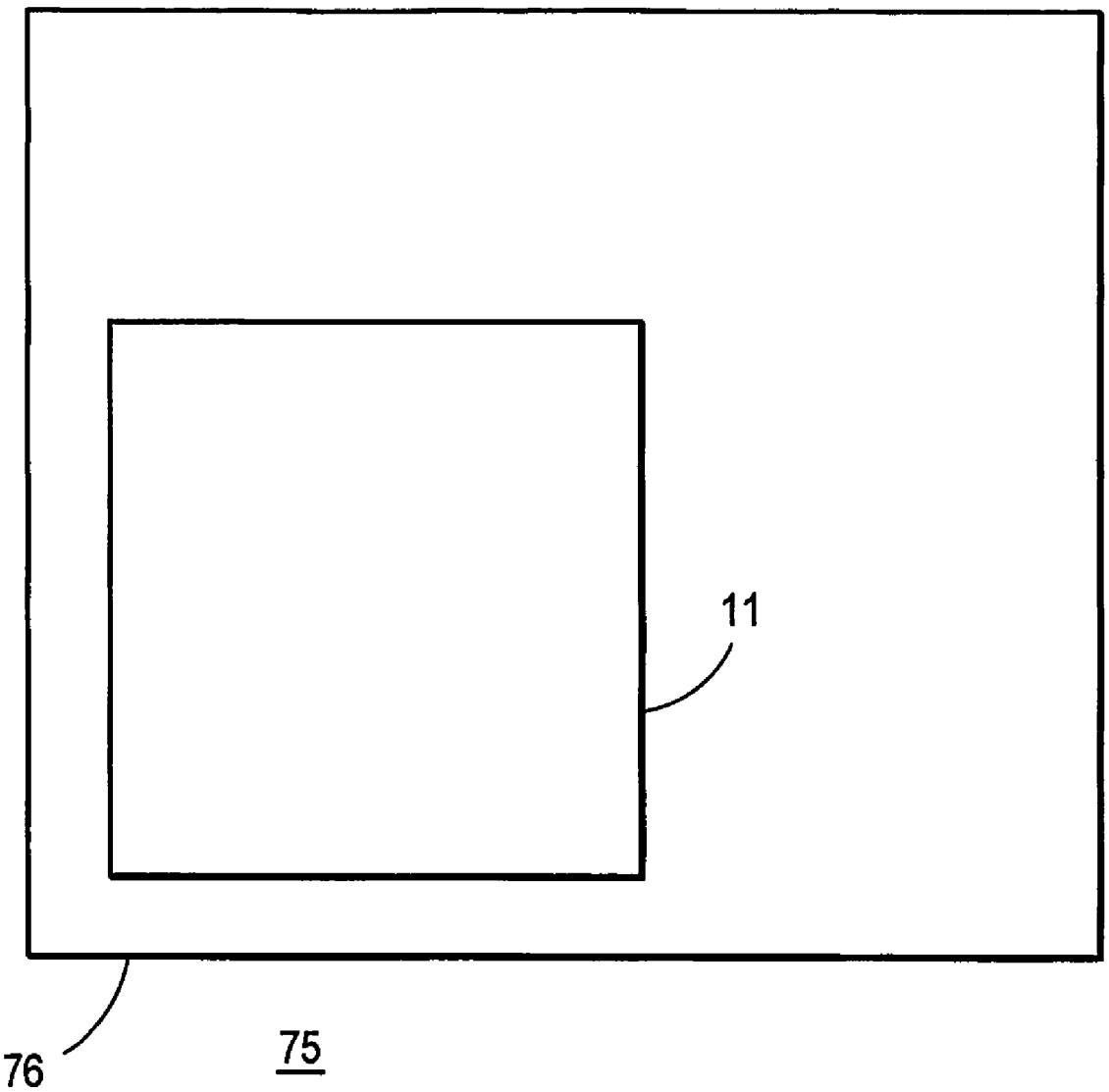
FIG. 5 illustrates an enlarged plan view of a semiconductor die that includes the valley voltage detection circuit of FIG. 1 in accordance with the present invention.

FIG. 5 schematically illustrates an enlarged plan view of a portion of an embodiment of a semiconductor device 75 that is formed on a semiconductor die 76. Valley voltage detection circuit 11 is formed on die 76. Die 76 may also include other circuits that are not shown in FIG. 3 for simplicity of the drawing. For example, die 76 may include portions of controller 14.

In view of all of the above, it is evident that a novel device and method is disclosed. Included, among other features, is converting a negative gate current or base current of a transistor into a positive current and using the positive current to detect the de-magnetization of an inductor that is driven by the power transistor. Steering the negative gate current initially through a parasitic internal diode of a driver transistor facilitates controlling the path of the negative current flow, steering a majority of the negative gate current through a detection transistor and a current mirror facilitates converting the negative gate current to a positive current and minimizes the amount of current flowing through the parasitic internal diode thereby facilitating using the positive current for measuring or detecting the negative gate current.

While the invention is described with specific preferred embodiments, it is evident that many alternatives and variations will be apparent to those skilled in the semiconductor arts. For example, transistors 32 and 33 can be replaced by an optical coupler or transistors 32, 33, and 34 may be bipolar transistors. Additionally, transistor 33 can be replaced by a resistor between input 45 and transistor 32. In such a case, the positive input to comparator 39 can be connected to the node between the resistor and transistor 32.

The invention claimed is:

1. A method of compensating a negative current flow comprising:
providing a first transistor having a negative current flow into a control electrode of the first transistor;
coupling a driver transistor to a voltage return to drive the control electrode of the first transistor;
coupling a first current carrying electrode of a detector transistor to the control electrode of the first transistor;
blocking the negative current from flowing from the voltage return through the driver transistor; and
enabling the detector transistor to conduct a positive compensation current from a supply voltage input to the control electrode of the first transistor when a voltage at the first current carrying electrode of the detector transistor is no less than a first voltage.

2. The method of claim 1 wherein blocking the negative current from flowing from the voltage return through the driver transistor includes steering a first portion of the negative current from the voltage return to the first current carrying electrode of the detector transistor.

3. The method of claim 2 wherein steering the first portion of the negative current from the voltage return to the first current carrying electrode of the detector transistor includes steering the first portion of the negative current to flow from the voltage return through a body diode of the driver transistor wherein the first portion of the negative current flowing through the body diode generates the first voltage across the body diode.

4. The method of claim 1 wherein enabling the detector transistor to conduct the positive compensation current from the supply voltage input to the control electrode of the first transistor includes enabling the detector transistor to conduct the positive compensation current that is equal to a second portion of the negative current.

5. The method of claim 4 further including conducting the positive compensation current from the supply voltage input through a reference transistor of a current mirror and generating a positive output current from the current mirror that is representative of the second portion of the negative current.

6. The method of claim 1 wherein enabling the detector transistor to conduct the positive compensation current includes applying an offset reference voltage to a control electrode of the detector transistor wherein the offset reference voltage is no greater than a threshold voltage of the detector transistor.

7. The method of claim 1 wherein providing the first transistor having the negative current flow into the control electrode of the first transistor includes coupling the first transistor to drive an inductor and disabling the first transistor to stop current flow through the inductor and generate the negative current flow.

8. A negative current detection circuit comprising:
a driver transistor having a first current carrying electrode coupled to provide a positive current flow from a second current carrying electrode of the driver transistor to a voltage return;
a first transistor having a control electrode coupled to be driven by the second current carrying electrode of the driver transistor;
a detector transistor having a first current carrying electrode coupled to the second current carrying electrode of the driver transistor to provide a positive compensation current to the control electrode of the first transistor, the detector transistor having a threshold voltage; and
a current mirror coupled to conduct the positive compensation current from a voltage input to the detector transistor and coupled to generate an output current representative of the positive compensation current.

9. The negative current detection circuit of claim 8 wherein the current mirror coupled to conduct the positive compensation current from the voltage input to the detector transistor and generate the output current includes a mirror reference transistor having a first current carrying electrode and a control electrode coupled to conduct the positive compensation current to the detector transistor, a second current carrying electrode coupled to the voltage input, and a mirror slave transistor having a control electrode coupled to the control electrode of the mirror reference transistor, a first current carrying electrode coupled to the voltage input, and a second current carrying electrode coupled to supply the output current.

10. The negative current detection circuit of claim 9 further including a resistor having a first terminal coupled to the second current carrying electrode of the mirror slave transistor, and a second terminal coupled to the voltage return.

11. The negative current detection circuit of claim 8 wherein the driver transistor having the first current carrying electrode coupled to provide the positive current flow includes the first current carrying electrode coupled to an anode of a diode and a cathode of the diode coupled to the voltage return.

12. The negative current detection circuit of claim 11 further including a diode coupled in series with the driver transistor between the first current carrying electrode of the detector transistor and voltage return.

13. The negative current detection circuit of claim 8 wherein the detector transistor having the first current carrying electrode coupled to the second current carrying electrode of the driver transistor includes a control electrode of the detector transistor coupled to receive a reference voltage.

14. The negative current detection circuit of claim 13 wherein the control electrode of the detector transistor coupled to receive the reference voltage includes the control electrode coupled to receive the reference voltage that is approximately equal to the threshold voltage of the detector transistor.

15. A method of forming a negative current compensation circuit comprising:
coupling a first transistor to generate a negative current into a control electrode of the first transistor;
forming a driver transistor having a first current carrying electrode coupled to drive the control electrode of the first transistor, and a second current carrying electrode coupled to block the negative current from flowing from a voltage return through the driver transistor to the control electrode of the first transistor; and
forming a detector transistor having a first current carrying electrode coupled to generate a positive compensation current that flows from a voltage input to the control electrode of the first transistor responsively to the negative current producing a first voltage at the first current carrying electrode of the detector transistor wherein the positive compensation current is representative of at least a portion of the negative current.

16. The method of claim 15 further including forming a current mirror to conduct the positive compensation current to the detector transistor and responsively form a positive detection current from the current mirror that is representative of the positive compensation current.

17. The method of claim 15 wherein forming the driver transistor having the first current carrying electrode coupled to drive the control electrode of the first transistor, and the second current carrying electrode coupled to block the negative current includes forming a diode in series with the driver transistor between the voltage return and the first current carrying electrode of the detector transistor.

18. The method of claim 17 wherein forming the diode in series with the driver transistor between the voltage return and the first current carrying electrode of the detector transistor includes coupling the diode as one of either coupling an anode of the diode to the second current carrying electrode of the driver transistor or coupling a cathode of the diode to the first current carrying electrode of the driver transistor.

19. The method of claim 15 wherein forming the detector transistor having the first current carrying electrode coupled to generate the positive compensation current that flows from the voltage input to the control electrode of the first transistor responsively to the negative current producing the first voltage at the first current carrying electrode of the detector transistor includes forming the detector transistor to generate the positive compensation current responsively to the negative current flow producing the first voltage that is less than a voltage applied to the voltage return.

20. The method of claim 15 wherein coupling the first transistor to generate the negative current flow into the control electrode of the first transistor includes coupling the first transistor to drive an inductor and responsively generate the negative current flow after disabling the first transistor.

\* \* \* \* \*